United States Patent
Ehbets

(10) Patent No.: US 7,460,215 B2
(45) Date of Patent: Dec. 2, 2008

(54) METHOD AND DEVICE FOR OPTICALLY MEASURING DISTANCE OR SPEED

(75) Inventor: Hartmut Ehbets, Berneck (CH)

(73) Assignee: Leica Geosystems A.G., Heerbrugg (CH)

( * ) Notice: Subject to any disclaimer, the term of this patent is extended or adjusted under 35 U.S.C. 154(b) by 0 days.

(21) Appl. No.: 10/333,565

(22) PCT Filed: Jul. 6, 2001

(86) PCT No.: PCT/EP01/07791

§ 371 (c)(1), (2), (4) Date: Jul. 17, 2003

(87) PCT Pub. No.: WO02/08692

PCT Pub. Date: Jan. 31, 2002

(65) Prior Publication Data

US 2004/0012771 A1 Jan. 22, 2004

(30) Foreign Application Priority Data

Jul. 24, 2000 (EP) .................................. 00115838

(51) Int. Cl.
*G01C 3/08* (2006.01)
*G01P 3/36* (2006.01)

(52) U.S. Cl. ........................................ 356/4.01; 356/28

(58) Field of Classification Search ....... 356/4.01–5.15, 356/8, 9, 28; 359/399
See application file for complete search history.

(56) References Cited

U.S. PATENT DOCUMENTS 4,131,365 A * 12/1978 Pryor .......................... 356/505
4,336,997 A * 6/1982 Ross et al. .................. 356/4.05
4,916,324 A * 4/1990 Meier ..................... 250/559.38
5,044,744 A * 9/1991 Ogawa et al. ................ 356/5.1
5,521,696 A * 5/1996 Dunne ........................ 356/5.07
6,048,105 A * 4/2000 Ohtomo et al. ............... 385/88
6,411,371 B1 * 6/2002 Hinderling et al. .......... 356/4.01
6,485,599 B1 * 11/2002 Glownia et al. ........... 156/272.8
6,504,602 B1 * 1/2003 Hinderling .................. 356/5.1

FOREIGN PATENT DOCUMENTS

DE 2445966 A * 4/1976
EP 987564 A * 3/2000
JP 03276004 A * 12/1991

OTHER PUBLICATIONS

Patent Abstracts of Japan, Pub. No. 03276004, Jun. 12, 1991, Tomoyuki.*

* cited by examiner

Primary Examiner—Isam Alsomiri
(74) Attorney, Agent, or Firm—Van Dyke, Gardner, Linn & Burkhart, LLP

(57) ABSTRACT

The invention relates to a method for measuring a distance-related variable such as distance, speed or acceleration, or for levelling. An emitting device (1-6) comprising at least one microlaser (3) is used as an emitter, and the beam reflected off an object surface is received and evaluated for measurement. A beam is emitted and evaluated after being received, in a substantially simultaneous manner in at least two different wavelengths. Preferably, said method is carried out by means of a device whereby the microlaser (3) in the form of a passively pulsating microlaser (3) emits at least two different wavelengths. A receiver (15, 40) for the laser beam reflected off an object is arranged downstream from the evaluating device (41).

27 Claims, 3 Drawing Sheets

METHOD AND DEVICE FOR OPTICALLY MEASURING DISTANCE OR SPEED

BACKGROUND OF THE INVENTION

The present invention relates to a method for optically measuring distance or speed, according to the preamble of claim 1, and to a device for optically measuring distance or speed or for a levelling device, according to the preamble of claim 4.

In devices for measuring distance and/or speed, the range—with otherwise identical technical properties—is the greater the higher the peak pulse power of the emitted laser pulses. On the other hand, for safety reasons, the peak pulse power cannot be increased without limit. The laser safety regulations permit higher peak pulse powers for wavelengths >1050 nm, i.e. in an invisible wavelength range, than for visible radiation.

Although this makes it possible to achieve longer ranges, a visible laser beam also has a number of advantages, such as
- visualization of the measuring beam on the object;
- possibility for checking and, if required, adjusting the position of the axis of the laser beam relative to the telescope axis;
- reduction of the danger to the eye through the aversion reaction of an affected person, including the blink reflex.

SUMMARY OF THE INVENTION

It is the object of the invention to provide a method and a device of said type so that all stated advantages are achievable. This object is achieved by the defining features of claim claim 1 and claim 4, respectively.

When it is stated that the at least two different wavelengths of the radiation are evaluated after being received, this need not mean that both lead to a result, but it is possible for the visible beam to be evaluated, for example, so that it is used for marking the object or the target point, whereas the other wavelength, for example in the infrared range, serves for a distance measurement or a variable derived therefrom, such as speed or acceleration. This will generally be a transit time measurement, in particular with pulsed light, more rarely with phase comparison, although the distance measurement could also be performed trigonometrically, i.e. in the manner of a basic distance-measuring apparatus, as in the case of levelling devices.

In each case, however, it is thus possible, for example, to correct the effect of atmospheric refraction as well as to combine the advantages of a visible laser beam with those of a laser in the infrared range.

The output of at least two different wavelengths could be effected per se in different ways, for example by arranging two light sources which are preferably (but not necessarily) combined with one another in a single beam path. However, it will generally be preferable if the laser arrangement has only a single laser for generating the at least two wavelengths.

It is advantageous if a device operating according to such a method has the features of claim 4. This is because a passively pulsating solid-state laser can be used. However, conventional solid-state lasers are very energy-consumptive, so that limits are encountered here if they are to be supplied with sufficient energy in a portable device, such as a distance-measuring device. The use of a microlaser, as described, for example, by N. Mermilliod et al. in Applied Physics Letters, 1991, Vol. 59, No. 27, page 3519, makes it possible for a passively pulsating laser also to be advantageously used in a portable device.

BRIEF DESCRIPTION OF THE DRAWINGS

Further details and features of the present invention are evident from the following description of embodiments shown schematically in the drawing.

DESCRIPTION OF THE PREFERRED EMBODIMENT

Figure 1:
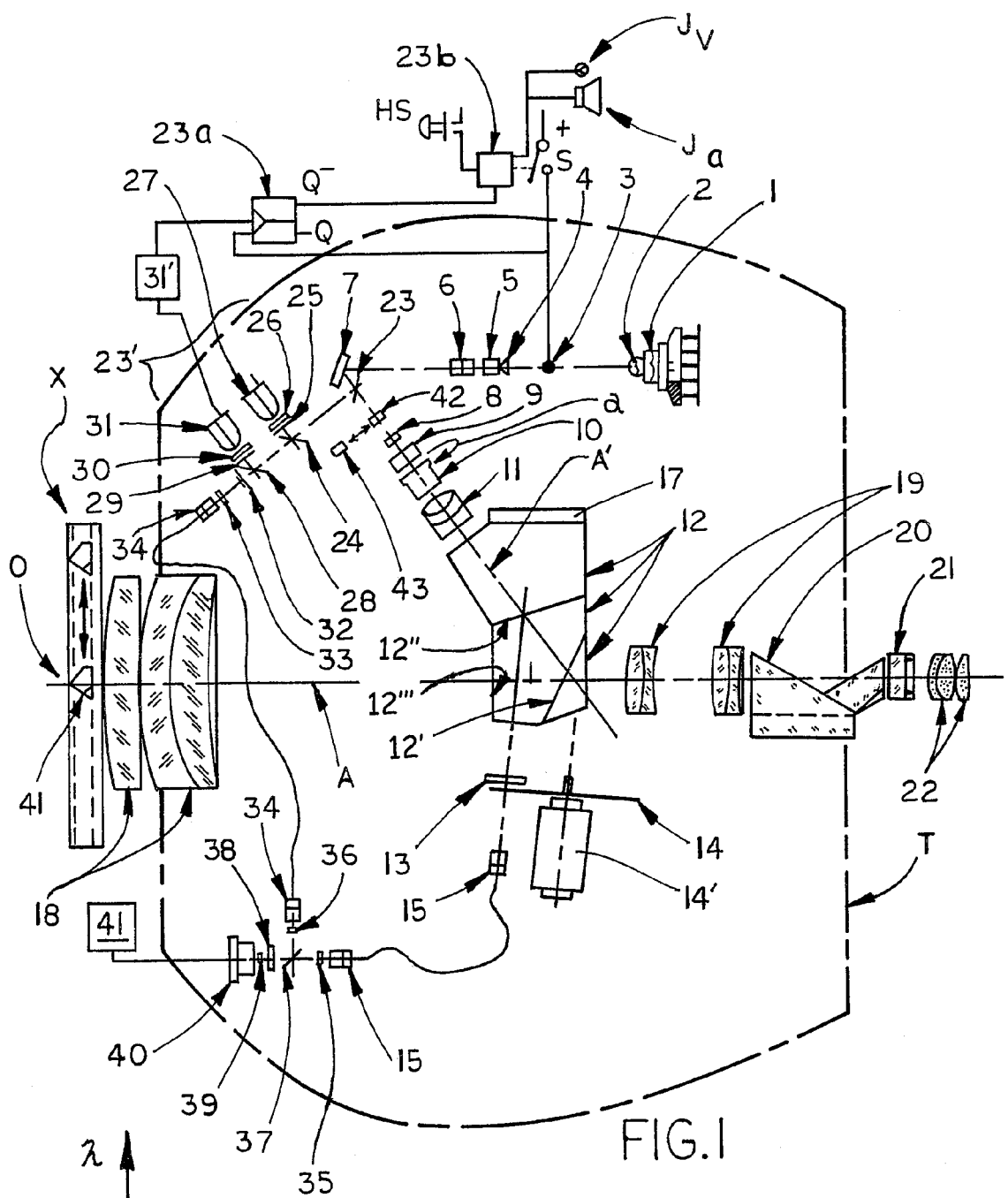
FIG. 1 shows a first embodiment of a tacheometer optical system according to the invention.

Initially a pump laser 1 with a convex lens 2 arranged in front of it and a thermoelectric cooler 1' present behind it is provided in a tacheometer housing T merely indicated by a dash-dot line. The pump laser 1 throws, in a manner known per se, pump power in the form of radiation onto a microlaser 3 which is present in front of it in the focal plane of the lens 2 and in turn emits a laser beam via a lens 4. It is advantageous if a block filter 5 for the pump laser radiation of the laser 1 is coordinated with this (individual or multiple) lens 4, in particular present downstream of said lens in the manner shown.

Figure 2:
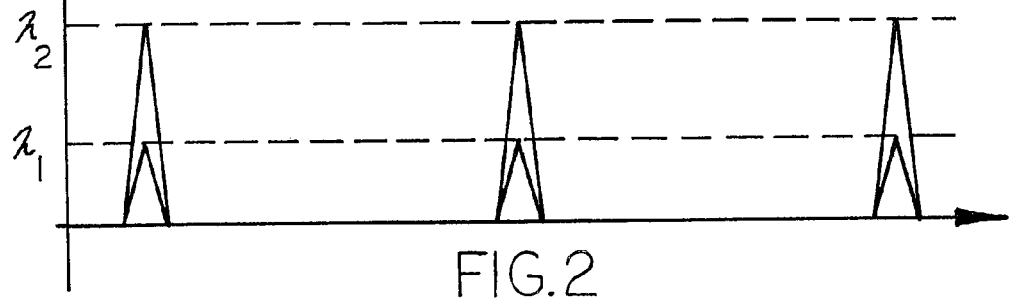
FIG. 2 shows the available pulses of two different wavelengths.

In the beam path, an optical frequency converter 6 is provided after the microlaser (or microchip laser) 3. With a frequency converter, such as, for example, KTP (potassium titanyl phosphate) as a frequency doubler, a wavelength of about 532 nm, which is in the visible range, is generated by generating the second harmonic, in addition to the wavelength output by the laser 3, for example of about 1064 nm (infrared). "Additionally" because such an optical frequency converter converts only a part of the incident radiation. Two different wavelengths $\lambda 1$ and $\lambda 2$ therefore emerge simultaneously at the exit of the frequency converter 6, as shown in FIG. 2.

Where an optical "frequency converter" is referred to here, and a frequency doubler is the preferred form of such a frequency converter, frequency tripling is also entirely possible. Such tripling can be effected by frequency doubling and subsequent mixing (frequency addition) of the doubled signal with the signal of the laser 3, i.e. $f \Rightarrow 2f, 2f+f=3f$.

The emitted beam thus generated and having the two different wavelengths $\lambda 1$ and $\lambda 2$ is deflected by a reflecting surface, such as a mirror 7. A beam splitter 23 which guides a part of the transmitted beam to a monitoring means 23' described further below is preferably arranged thereafter. Consequently, correct and reliable operation of the optical components described above can be monitored in order to avoid damage in particular by the invisible laser beam in the event of failure of the visible radiation.

As shown in FIG. 1, further optical components 8 to 11 are provided in the divergent beam path, i.e. in the emitted beam path. These comprise an optical system which produces beam divergence and can be formed, for example, by a single lens 8. This lens is optionally part of a temperature compensator known per se, the lens holder not shown here or a spacer ring connected thereto consisting of a material having a coefficient of thermal expansion such that temperature-related focal deviations are automatically compensated. For this purpose, the lens 8 is displaced owing to the thermal expansion of such a ring, for example against the action of a spring pressing it against the ring, although an interlocking connection of the lens with the expanding ring would also be conceivable. Such temperature compensators are known per se for optical systems.

A first parallel plate 9 which can be mounted in an inclinable manner not shown and with the aid of which the axis of the emitted beam and its position relative to the telescope axis A can be adjusted by inclining the first parallel plate 9 so that it lies exactly along the telescope axis can be provided thereafter in this divergent emitted beam path. For this purpose, the parallel plate 9 can have a cardanic mounting and can be adjustable with respect to its inclination to the axis A by an adjusting means known per se for optical purposes, such as two cams engaging the plate 9, acting at right angles to one another and rotatable from the outside of the housing T.

If desired, a further optical member which can be switched on and is in the form of a second parallel plate 10 acting as an attenuator and intended for defocusing the emitter during measurement in the case of measurement to a reflector, in particular mounted on the object, can be provided in this divergent emitted beam path, as indicated by an arrow a.

It has been found that the small divergence of less than 0.1 mrad, optionally of <0.05 mrad, or of only about 0.03 mrad, of the emitted diffraction-limited beam during measurement to reflectors, such as, in particular, triple reflectors, can be disadvantageous. This is because, on the one hand, the sighting of the reflector is very sensitive and therefore not very convenient for the user of the device and, on the other hand, the turbulence in the atmosphere, the so-called "atmospheric flickering", leads to strong variations in the measured signal and, consequently, to undesirably long measuring times. If a plane-parallel plate 10 is introduced into the beam path, the divergence of the emitted beam is slightly increased, for example from 0.03 to 0.5 mrad. Preferably a blocking filter for the visible wavelength and an attenuating filter for the IR wavelength should be mounted on the switchable parallel plate 10 so that the operator at the reflector is not dazzled by the visible light and not harmed by the IR radiation.

If required, it is also possible to provide a switching means, if necessary in the form of the plane-parallel plate 10 itself, in order alternately to emit an infrared or visible radiation component. Although this increases the measuring time, the limits of the laser safety regulations can be utilized fully, i.e. 100%, in this way (sequential operation). However, because the blink reflex of the eye takes 0.25 s, the change must be carried out relatively rapidly here, for example faster than 3 Hz, in particular faster than 4 Hz.

Furthermore, a telescope lens 18 is arranged in the tacheometer housing T. It will be possible per se to provide a separate emitting lens instead of the deflecting mirror 7 as the linear continuation of the beam emitted by the laser 3. If, however, the axis of the emitted beam is coaxial with the telescope axis A, according to the arrangement shown, parallaxes with respect to the field of view will be avoided. As described further below, the telescope lens 18 is preferably also the receiving optical system, at least in the main.

The telescope lens has a chromatic longitudinal deviation or aberration. This will be a problem particularly when—as in the present case—at least two different wavelengths $\lambda 1$, $\lambda 2$ are to be emitted and the lens 18 is simultaneously the emitting lens. A compensation lens 11 for compensating this chromatic longitudinal deviation should therefore preferably be provided in the emitted beam path. In the embodiment shown, this lens is composed of three members, for example cemented to one another.

In order to be able to survey object surfaces having a reflectivity differing from place to place and depth structures having a small lateral dimension or having sharp edges and corners, the measuring spot must be small and must not have troublesome diffraction rings. Beams having a Gaussian lateral intensity distribution in the short range (at the lens 18) have no diffraction rings at long range (e.g. at 500 m) if the Gaussian beam is not cut off.

However, the Gaussian beam is of course cut off by the edge of the lens 18. However, the intensity of the diffraction rings is the smaller the smaller the chosen diameter of the Gaussian beam in the lens 18. In practice, it was found that the illumination of the lens 18 is advantageously chosen so that the Gaussian laser beam is cut off by the edge of the lens only at an intensity value <0.09 times the maximum intensity. This is the case when the $1/e^2$ beam diameter is =<0.9 times the lens diameter. In fact, the intensity of the first diffraction ring at long range (e.g. at 500 m) is then <0.03 of the maximum intensity, which is just sufficiently small for most cases in practice. The $1/e^2$ beam diameter at the lens 18 should therefore be as small as possible so that the intensity of the diffraction rings is small (e is Euler's number). On the other hand, as mentioned above, it is necessary for the central laser spot at long range (e.g. at 500 m) to remain as small as possible. However, this is precisely the case when the laser beam diameter in the lens 18 is large. In practice, the $1/e^2$ diameter at long range (e.g. at 500 m) should be not more than twice as large as the minimum possible diameter (Airy diffraction disk) which occurs on simultaneous illumination of the lens 18. The central spot at long range is not more than twice as large as the Airy disk precisely when the illumination of the lens is chosen so that the edge of the lens cuts off the Gaussian intensity distribution at an intensity >0.004 of the maximum intensity. This corresponds to a $1/e^2$ diameter of the Gaussian beam, which is 0.6 times the lens diameter.

A dimensioning method for illuminating the emitting lens is obtained as a compromise:

$$\text{Lens diameter} \cdot 0.6 < \frac{1}{e^2} - \text{diameter of laser} < \text{lens diameter} \cdot 0.9.$$

As an example:

$$\frac{1}{e^2} - \text{diameter of laser} = \text{lens diameter} \cdot 0.75.$$

| | |
|---|---|
| Lens diameter | 2a = 40 mm |
| $1/e^2$ diameter of the laser at the lens | $2w_0$ = 30 mm |
| $1/e^2$ diameter of the laser at 500 m | $2w_0$ = 26 mm |
| Diameter of the 1st diffraction ring at 500 m | $2r_1$ = 52 mm |
| Intensity ratio of 1st diffraction ring to maximum intensity | $I_1/I_0$ = 0.0008 |

The emitted beam path arriving from the compensation lens 11 is reflected by means of a splitter prism 12 having a partly reflecting deflection surface 12' into the beam path of the telescope lens 18 with the axis A. The splitter prism 12 expediently has a further partly reflecting deflection surface 12" which is at a different angle and by means of which the received beam thrown onto it by the surface 12' is guided along the axis A" to a receiving means 13-15 and 34-40. The surface 12' is expediently provided with a selective coating so that only the visible component of the received light is let through but the infrared component is reflected.

The receiving means 13-15 and 34-40 has, in its entrance part, the receiving surface of an optical fiber 15. A parallel plate is advantageously present as a support of an antireflection screen 13, in front of this optical fiber 15. In the optical system shown, false reflection occurs even with high-quality manufacture and treatment, the strongest reflection of the emitted radiation which can be incident on the receiving means 13-15 and 34-40 originating from the splitter prism 12 itself, in particular from the surface 12'''. This reflected beam is of course divergent and has, at the position of the receiving fiber 15, a diameter which is about 500 times greater than the diameter of the optical fiber 15 itself. On the other hand, that beam of the receiving radiation required for transit time measurement which is incident on the optical fiber 15 is convergent owing to the focusing by the lens 18. This means that the diameter of the received beam will be smaller than the entrance area of the optical fiber 15, for example for an object which is more than about 80 m away.

The problem of false reflection is solved by an antireflection screen 13 which is arranged a distance away from the optical fiber 15, i.e. outside the image plane of the lens 18, which lies on the entrance surface. Thus, reflected radiation is shaded off over the diameter of the entrance area of the optical fiber 15, while the received radiation incident on the entrance area of the optical fiber 15 is virtually unattenuated since it is still sufficiently wide at the position of the antireflection screen 13. Of course, reflections other than those originating from the surface 12''' are also correspondingly attenuated by such an antireflection screen 13, since—in a centered optical system—they lie on the axis of the received beam. Since the telescope lens 18 is a centered optical system, and since both the laser radiation source and the entrance area of the optical fiber 15 are adjusted to the axis of this lens, all reflections and the shadow of the antireflection screen 13 which is caused by the reflection lie along this axis.

| As an example: | |
|---|---|
| Diameter of the antireflection screen: | 0.6 mm |
| Distance of the antireflection screen from the entrance area of the optical fiber | 7 mm |
| Diameter of the received beam in the plane of the antireflection screen | 2.3 mm |
| Signal loss due to the effect of the antireflection screen | 7% |

Further false and control reflections are "swallowed" by a neutral glass plate 17 which acts as an optical sump and is provided at the splitter prism 12.

An attenuating element 14 can alternatively be switched into the received beam path by means of a final control element 14' and serves for attenuating the excessively large received signal at small distances.

Components 19 to 22 of conventional nature are parts of the telescope. They comprise a focusing lens system 19 which is formed from an achromatic lens and can be brought from one extreme position E1 shown with solid lines into another extreme position E2 shown with dashed lines. This focusing lens system 19 is followed by an inverting prism 20 for inverting the image obtained from the lens 18. It is then expedient to provide a reticule 21, for example having crosshairs, and finally an eyepiece system 22 of conventional design.

By means of the beam splitter 23, a specific fraction of the emitted beam is passed to a monitoring means 23' which has at least one sensor or receiver 31 sensitive to the visible radiation emitted by the emitting arrangement 1 to 6. Thus, if the laser 3 is put into operation by means of a switch S, a start signal is sent to a logical stage 23a which can be addressed as a reference stage but is optionally formed by an NAND gate. In the present embodiment, this logical stage 23a is formed by a flip-flop which is switched by the signal arriving from switch S in that the flip-flop 23a is switched to its output Q. This output Q is connected to a control stage 23b for the switch S and opens the switch S when it receives a signal from the flip-flop 23a. The laser 3 is thus switched off.

The other input of the flip-flop 23a is connected to a pulse shaper stage 31' which is connected to the receiver 31 for visible light and evaluates its signal. A corresponding filter 30 is present upstream of the receiver 31, unless said receiver itself is formed so that it responds only to visible radiation. The receiver 31 receives the light emitted by the emitting arrangement 1-6 via a deflecting mirror which—as explained further below—is in the form of a beam splitter 28. If necessary, an attenuating element 29, such as a screen or a filter, may be present upstream of the receiver 31.

If—as a result of the incidence of visible radiation—the receiver 31 receives a signal, the stage 31' switches the flip-flop 23a back to the output Q which is not connected to any downstream stage. In this case, the control stage 23b therefore receives no signal and the switch S remains closed until the main switch HS is manually operated. If an NAND gate is used, the result is a signal at the control stage 23b whenever only the signal from the switch S is present at the input of the NAND gate, whereas the signal from the receiver 31 is missing.

It is advantageous if an indicator, for example by means of an acoustic indicating device 1a and/or a visual indicating device 1v is connected to the control stage for such a malfunction. A visual indicator can preferably be in the form of an LCD display, in particular when—as explained below—more than one possible error is monitored.

This is because this is only one possibility for monitoring the emitting arrangement 1 to 6. If the visible radiation is absent in spite of the fact that a switch is switched on, this would indicate a failure, for example of the frequency converter 6 producing the visible radiation. In this case, there is the danger that persons will be affected by the infrared laser beam without also being affected by the visible radiation attracting their attention, which is why the laser 3 should be switched off immediately.

The monitoring means 23' can, however, also have further components. It can have a further infrared-sensitive receiver 27 which is preferably upstream of the receiver 31 and monitors the emission of infrared radiation from the emitting arrangement 1-6. The circuit connected to this receiver or detector 27 can be designed analogously to the circuit described with reference to the stages 23a, 23b and 31'. Likewise, the optical arrangement may once again have a filter 26, an attenuator 25 and a beam splitter 24.

If in fact no signal at all is received after the switch S is closed, something which can be detected at the receiver 27, this does not mean, for example, that the frequency converter 6 is out of operation but that the laser 3 and/or its pump light source 1 is not functioning. Since this is a further monitorable malfunction, it is advantageous, as mentioned above, to form the visual indicator Iv as an LCD display. In this case, it will be advantageous if the control circuit 23b is in the form of a processor which receives the output signals of the two receivers 31 and 27 directly and indirectly (via evaluation or pulse shaper stages, such as the stage 31') and accordingly calls up the corresponding indicator from memory with downstream driver stage for actuating the display.

The further part-beam obtained via the beam splitter 28 is fed via a further attenuating element 32 (the power of the laser 3 should expediently be attenuated before the sensitive components) and a collecting lens 33 to a further receiving optical fiber 34 or a further receiver. This receiver serves for triggering the time counting in a downstream evaluation means 41 of conventional design.

The optical start pulse is advantageously fed via the same photodiode 40 (or another optoelectrical converter such as a phototransistor) which also receives the light signal obtained via the fiber bundle 15 after reflection by the sighted object.

A collecting lens 36 is present downstream of the fiber bundle 34 in order to avoid any light losses. Thereafter, the start pulse light passes to a beam splitter surface 37 which advantageously emits the light pulse via a filter 38 and further lens 39 to the photodiode 40. The filter 38 preferably transmits only the infrared laser radiation but blocks visible radiation, in order to prevent any influences. The photodiode 40 is part of the downstream electronic evaluation means 41.

The feed of the received pulse via the optical fiber 15 is formed analogously thereto. The received light emerging from the optical fiber 15 passes through a collecting lens 35 and then the beam splitter 27.

The visible component of the laser beam can be used for checking whether the position of the axis of the laser beam emitted by the emitting means 1-6 corresponds to the telescope sighting axis A, since—as shown in FIG. 2—the two emitted wavelengths $\lambda 1$ and $\lambda 2$ are coaxial, narrow light beams so that the target point for the invisible wavelength component is also detectable on the basis of the visible light mark.

For such a check, it is advantageous to provide a mounting means, such as a rail 42, but optionally also a pivotable support, for a triple reflector 11' and to fasten it to the outside of the holder (not shown) of the lens 18. Thus, the triple reflector 11' (or an arrangement of mirrors or lenses performing the same function) can thus be moved from the rest position x to the operating position o in the axis A. Alternatively, the holder of the lens 18 has a thread or a bayonet fitting for pushing on or screwing on such a triple reflector or its equivalent.

Figure 3:
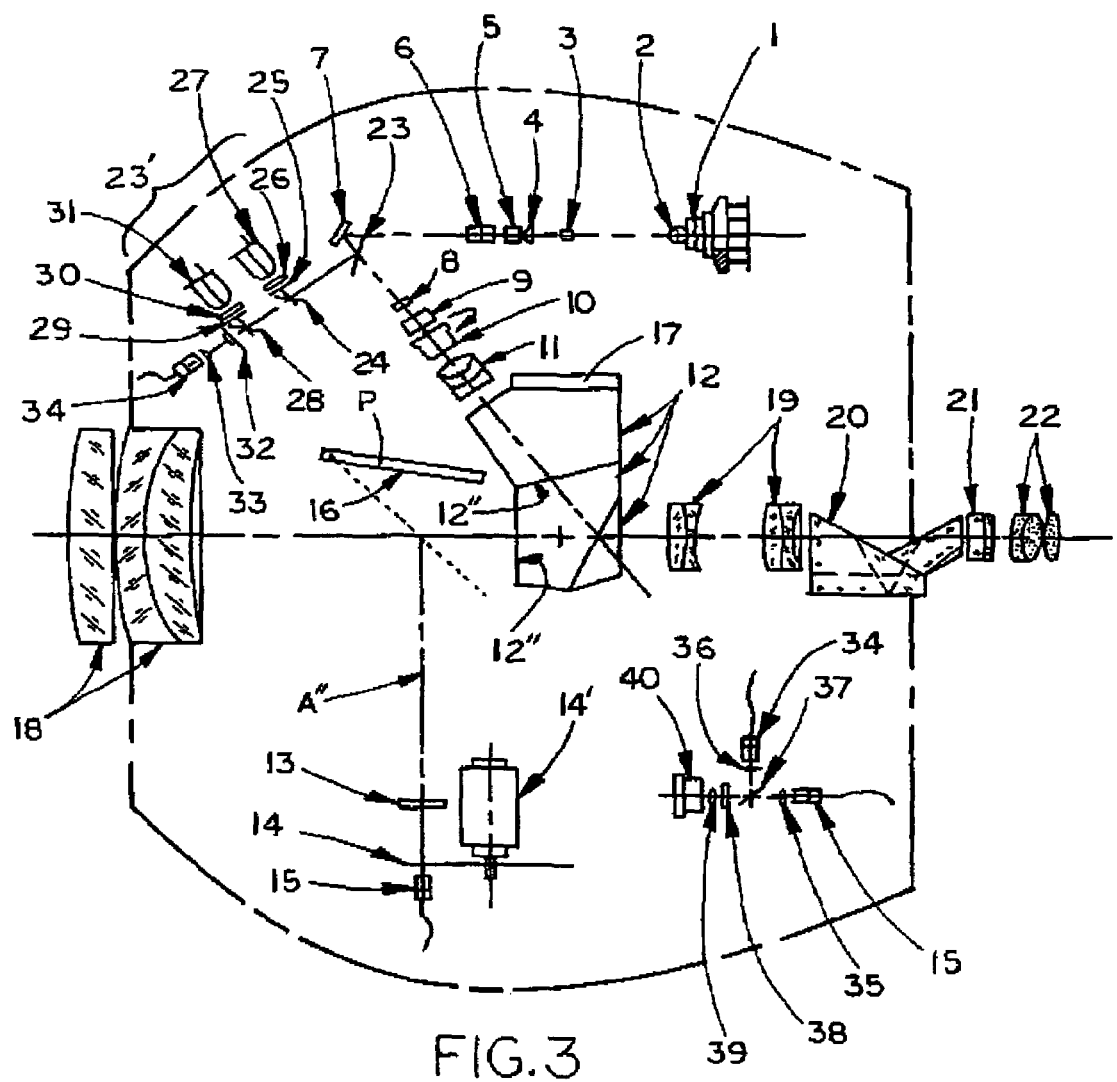
FIG. 3 shows a second embodiment of a tacheometer optical system according to the invention and FIG. 4 shows a hand-held device designed according to the invention, for measuring distance.

FIG. 3 shows a diagram corresponding to FIG. 1 (without electronic components described above). Parts having the same function have the same reference numerals as in FIG. 1. What is different in particular is that a relatively thin beam splitter plate or parallel plate 16 can be swiveled into the convergent beam path behind the telescope lens 18. The reason for this is that the combined splitter prism 12 for the emitted and the received beam path must be provided with a very low-reflection coating in the beam path of the telescope 18 in order to prevent the receiver from being overloaded by the photodiode 40 by emitter reflections.

In order to use the splitter prism 12 only for inputting the emitted radiation and not also for outputting the received radiation (in which case the partial reflective coating of the surface 12" may optionally be dispensed with), the parallel plate can be swiveled about a pivot point P out of the rest position shown with solid lines into the operating position which is shown by dashed lines and in which it deflects the received beam along the receiving axis A". Of course, instead of being pivotable, the plate 16 could also be brought in a different manner from a rest position to the operating position shown, for example said plate could be displaceable.

Using an inclined parallel plate of this type in the convergent beam path of the telescope lens 18 has not been customary to date since this results in an astigmatism which adversely affects the quality of the image. However, the magnitude of the astigmatism depends on the respective thickness of such a parallel plate 16. It is therefore preferable if the parallel plate 16 has a thickness of <0.3 mm, preferably <0.2 mm, i.e. is very thin. For mechanical strengthening, it is therefore expediently supported by a frame surrounding it.

The parallel plate 16 is preferably coated so that the visible light for the telescope function is transmitted and the appropriate splitter ratio is realized for the wavelength of the distance-measuring device (e.g. infrared): although it should also be conceivable, with regard to the pivotability of the parallel plate 16 (preferably toward a stop which determines the operating position and is adjustable by a cam or a screw or the like), completely to dispense with a splitter function and to swivel the parallel plate 16 into the operating position for the measurement and to dispense with viewing of the sighted object during this time, which is not very convenient for the user. In such a case, the parallel plate 16 could also be fixed. In the interest of improved image quality in the case of a parallel plate 16 present in the rest position, however, the pivotable arrangement is preferable.

Figure 4:
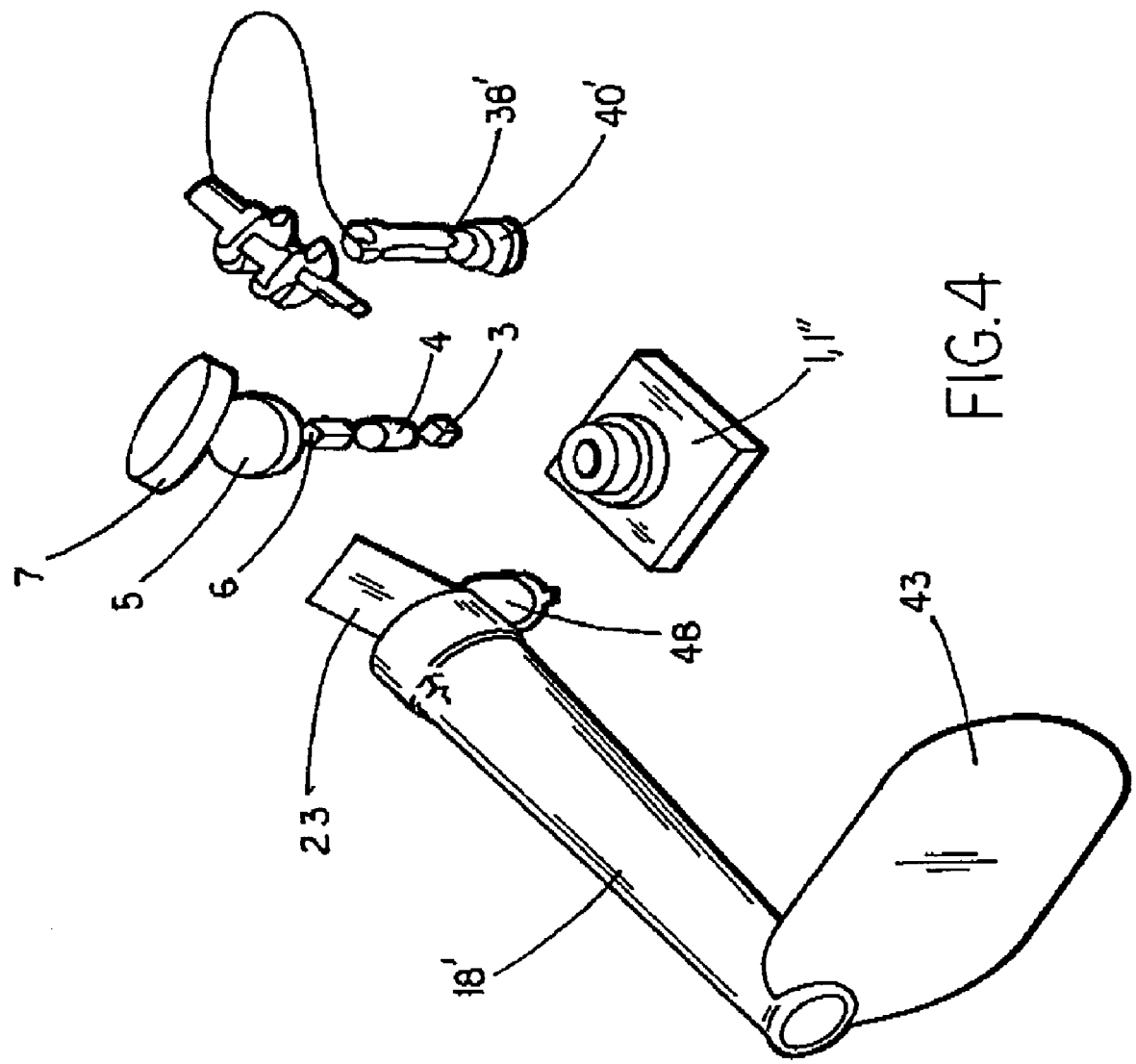

While the embodiments according to FIGS. 1 and 3 have optical designs as are possible for a tacheometer, FIG. 4 shows the arrangement for a portable distance-measuring apparatus. It should be noted that whether the distance is determined by means of a single measurement or whether the speed or another derivative, such as the acceleration, is measured by double measurement, depends only on the type of evaluation means 41 (cf. FIGS. 1 and 3). It has also already been mentioned that the invention can also be advantageously used in the case of levelling devices based on the trigonometrical principle—for example for correcting atmospheric refraction. Such a levelling device could in principle have a design similar to that described below with reference to FIG. 4. Here too, parts having the same function as in the preceding embodiments have the same reference numerals.

FIG. 4 shows the pump laser 1 on a Peltier element 1". Microlaser 3, lens 4, frequency converter (KTP) 6, filter 5, mirror 7 and beam splitter 23 are shown. A pin diode 48 for the reference light path is present on the holder 18' of the lens, which in this case need not necessarily be in the form of a telescope. The receiving lens is housed in a housing 43. The fiber holder with the fiber leading to an interference filter and the receiving diode is merely indicated on the right of FIG. 4; in principle, this arrangement has a similar design to that described above.

In the context of the invention, the design of the distance-measuring apparatus is of course variable within wide limits. The present invention makes it possible to provide a microlaser as a light source, radiation of at least two different wavelengths being emitted, optionally both via one microlaser, which are optionally emitted simultaneously or substantially simultaneously (if the sequential operation described above following relatively rapidly in succession is desired), and, after reception, the information available via the radiation of different wavelengths being evaluated together, either for the actual measurement or for the sighting or the like. "Substantially simultaneously" is to be understood in this context.

It could also be possible, for example, to use two or more different wavelengths in the invisible range for the correction of the atmospheric refraction, the visible radiation optionally being dispensed with.

The invention claimed is:

1. A method for optically measuring distance or speed, comprising:
   providing a transmitting arrangement having at least one microchip laser that is adapted to emit radiation in the form of pulses and a frequency converter that converts a portion of the radiation emitted by said at least one microchip laser to a different wavelength, wherein said transmitting arrangement emits radiation in the form of a common beam toward an object, wherein said common beam being a diffraction-limited Gaussian beam of the at least two wavelengths ($\lambda 1, \lambda 2$), the common beam of the radiation reflected by a surface of an object being received and evaluated, wherein the transmitting arrangement emits at least radiation having a wavelength in the invisible range ($\lambda 1$), said wavelength in the invisible range and radiation of another wavelength ($\lambda 2$) simultaneously with the radiation having a wavelength ($\lambda 1$) wherein the further radiation of another wavelength ($\lambda 2$) is in the visible range;

evaluating together the information available after the at least two wavelengths ($\lambda 1, \lambda 2$) have been received; and monitoring the radiation of visible radiation and switching off at least that part of the transmitting arrangement which emits the invisible radiation if said monitoring determines that the visible radiation is absent.

2. A device for optically measuring distance or speed or for a levelling device, comprising:

a transmitting arrangement emitting a laser beam via an object lens;

a receiver for the laser beam reflected by an object and passed through said object lens;

wherein said transmitting arrangement comprises at least one microchip laser that is adapted to emit radiation in the form of pulses and a frequency converter, said frequency converter adapted to convert a portion of the radiation emitted by said at least one microchip laser to a different wavelength;

said transmitting arrangement emitting a common beam made up of at least two different wavelengths ($\lambda 1, \lambda 2$) emitted simultaneously, one of said wavelengths in the infrared range and one of said wavelengths in the visible range, said beam being a diffraction-limited Gaussian beam of different wavelengths ($\lambda 1, \lambda 2$);

said lens being formed for emission of the diffraction-limited, Gaussian beam; and evaluating means downstream of said receiver for evaluating the at least two different wavelengths ($\lambda 1, \lambda 2$); and monitoring means for monitoring the radiation of visible radiation and a switching stage for switching off at least that part of said transmitting arrangement which emits the invisible radiation in response to said monitoring means determining that visible radiation is absent.

3. The device as claimed in claim 2, which is in the form of a tachometer having a telescope lens.

4. The device as claimed in claim 3, wherein the beam path of said tachometer into which the emitted beam of said transmitting arrangement can be introduced is the beam path of said telescope lens.

5. The device as claimed in claim 2, which is in the form of a hand-held distance-measuring apparatus or speed-measuring apparatus.

6. The device as claimed in claim 2, wherein the lens is formed in such a way that the laser beam having a Gaussian intensity distribution is vignetted and is cut off at an intensity value for a first diffraction ring of <0.15 times a maximum intensity.

7. The device as claimed in claim 6, wherein the intensity distribution of said Gaussian beam is cut off at an intensity value for the first diffraction ring of less than 0.12 times.

8. The device as claimed in claim 6, wherein the intensity distribution of said Gaussian beam is cut off at an intensity value for the first diffraction ring of less than 0.09 times.

9. The device as claimed in claim 2 including an optical filter which transmits only the invisible wavelength component but blocks visible radiation upstream of the receiver.

10. The device as claimed in claim 2, wherein said transmitting arrangement and said receiver have a coaxial, common optical system.

11. The device as claimed in claim 10 including a tachometer with a telescope lens, said telescope lens forming said common optical system.

12. The device as claimed in claim 2 including a mounting means for an upstream arrangement of an optical element that is coordinated with the lens.

13. The device as claimed in claim 12, wherein said optical element comprises a back-reflection element.

14. The device as claimed in claim 13, wherein said optical element comprises a triple reflector or a lens-mirror combination.

15. The device as claimed in claim 2 including an adjusting means for adjusting the laser spot in the divergent beam path that is coordinated with said lens.

16. The device as claimed in claim 2 including a compensating lens for compensating the chromatic longitudinal deviation or aberration of the lens that is coordinated with said lens in an emitted beam path.

17. The device as claimed in claim 2 including a temperature compensator that is displaceable as a function of temperature and coordinated with said lens in an emitted beam path.

18. The device as claimed in claim 2 including an optionally switchable parallel plate for widening the beam that is coordinated with said lens in an emitted beam path.

19. A device for optically measuring distance or speed or for a levelling device, comprising:

a transmitting arrangement emitting a laser beam via an object lens;

a receiver for the laser beam reflected by an object and passed through said object lens;

wherein said transmitting arrangement comprises at least one microchip laser that is adapted to emit radiation in the form of pulses and a frequency converter, said frequency converter adapted to convert a portion of the radiation emitted by said at least one microchip laser to a different wavelength;

said transmitting arrangement emitting a common beam made up of at least two different wavelengths ($\lambda 1, \lambda 2$) emitted simultaneously, one of said wavelengths in the infrared range and one of said wavelengths in the visible range, said beam being a diffraction-limited Gaussian beam of different wavelengths ($\lambda 1, \lambda 2$);

said lens being formed for emission of the diffraction-limited, Gaussian beam; and evaluating means downstream of said receiver for evaluating the at least two different wavelengths ($\lambda 1, \lambda 2$); and a beam splitter for separating the two wavelength components, and an antireflection screen arranged outside an image plane of said receiver upstream of said receiver.

20. The device as claimed in claim 19 including a parallel plate upstream of said receiver in a convergent beam path of said lens for outputting the measuring beam reflected by an object toward said receiver.

21. The device as claimed in claim 20, wherein said parallel plate has a thickness of <0.3 mm.

22. The device as claimed in claim 21, wherein said parallel plate has a thickness of less than 0.2 mm.

23. The device as claimed in claim 21, wherein said parallel plate is partially reflecting.

24. The device as claimed in claim 20, wherein said parallel plate is movable from a rest position outside the beam path of said lens into an operating position within the beam path.

25. The device as claimed in claim 24, wherein said parallel plate is pivotable.

26. The device as claimed in claim 19, wherein said beam splitter comprises a prism.

27. The device as claimed in claim 19, wherein said anti-reflection screen is dimensioned according to a cross-section of an entry surface of said receiver.

* * * * *